(12) United States Patent
Takahashi

(10) Patent No.: US 8,018,600 B2
(45) Date of Patent: Sep. 13, 2011

(54) INTERFEROMETER FOR MEASURING DISPLACEMENT INFORMATION OF AN OBJECT

(75) Inventor: Tomotaka Takahashi, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 394 days.

(21) Appl. No.: 12/265,208

(22) Filed: Nov. 5, 2008

(65) Prior Publication Data

US 2009/0116034 A1    May 7, 2009

(30) Foreign Application Priority Data

Nov. 6, 2007    (JP) ................................. 2007-288524

(51) Int. Cl.
*G01B 11/02* (2006.01)
(52) U.S. Cl. .................................................... 356/498
(58) Field of Classification Search .................. 356/496, 356/498
See application file for complete search history.

(56) References Cited

U.S. PATENT DOCUMENTS

| | | | | |
|---|---|---|---|---|
| 5,000,572 A * | 3/1991 | Nose et al. ..................... | 356/488 |
| 5,172,186 A * | 12/1992 | Hosoe ........................... | 356/493 |
| 5,305,088 A * | 4/1994 | Hosoe ........................... | 356/487 |
| 5,414,516 A | 5/1995 | Morishita et al. | |
| 5,631,736 A * | 5/1997 | Thiel et al. .................... | 356/486 |
| 6,304,330 B1 * | 10/2001 | Millerd et al. ................. | 356/521 |
| 6,552,808 B2 * | 4/2003 | Millerd et al. ................. | 356/521 |
| 6,556,509 B1 * | 4/2003 | Cekorich et al. .............. | 356/477 |
| 6,847,457 B2 * | 1/2005 | Tobiason et al. .............. | 356/495 |
| 6,850,329 B2 * | 2/2005 | Tobiason et al. .............. | 356/495 |
| 6,992,778 B2 * | 1/2006 | Nahum .......................... | 356/512 |
| 7,170,611 B2 * | 1/2007 | Millerd et al. ................. | 356/491 |
| 7,292,347 B2 * | 11/2007 | Tobiason et al. .............. | 356/498 |
| 7,298,497 B2 * | 11/2007 | Millerd et al. ................. | 356/512 |

(Continued)

FOREIGN PATENT DOCUMENTS

DE    195 39 134 A1    4/1997

(Continued)

OTHER PUBLICATIONS

Heydemann, "Determination and correction of quadrature fringe measurement errors in interferometers," Applied Optics USA, vol. 20, No. 19, 1981, pp. 3382-3384.

*Primary Examiner* — Patrick J Connolly
(74) *Attorney, Agent, or Firm* — Oliff & Berridge, PLC

(57) ABSTRACT

An interferometer includes a laser beam source, a light wave dividing and synthesizing portion for 2-demultiplexing and irradiating a laser beam irradiated from the laser beam source on a measuring target and synthesizing a light having each displacement information, a multiphase interference light generating portion for generating, from a synthesized laser beam, a first interference light having a first phase, a second interference light having a second phase which is different from the first phase by 180 degrees, a third interference light having a third phase which is different from the first phase by 90 degrees, and a fourth interference light having a fourth phase which is different from the first phase by 270 degrees, a 3-phase signal generating portion for generating a 3-phase signal having a phase difference of 90 degrees on the basis of first to fourth interference signals based on the first to fourth interference lights, and a 2-phase signal generating portion for carrying out a vector synthesis over the 3-phase signal having a phase difference of 90 degrees, thereby generating a 2-phase signal having a phase difference of 90 degrees.

4 Claims, 6 Drawing Sheets

U.S. PATENT DOCUMENTS

| | | | |
|---|---|---|---|
| 7,375,820 B2 * | 5/2008 | Ishizuka et al. | 356/494 |
| 2002/0003628 A1 * | 1/2002 | James et al. | 356/521 |
| 2003/0053071 A1 * | 3/2003 | James et al. | 356/491 |
| 2004/0070767 A1 * | 4/2004 | Tobiason et al. | 356/495 |
| 2004/0091066 A1 * | 5/2004 | Noe | 375/332 |
| 2004/0107068 A1 | 6/2004 | Chapman et al. | |
| 2005/0030550 A1 * | 2/2005 | Nahum | 356/521 |
| 2005/0275848 A1 * | 12/2005 | Hill | 356/512 |
| 2007/0046951 A1 * | 3/2007 | Hill | 356/512 |
| 2009/0116034 A1 * | 5/2009 | Takahashi | 356/498 |
| 2010/0231922 A1 * | 9/2010 | Hess et al. | 356/496 |

FOREIGN PATENT DOCUMENTS

| | | |
|---|---|---|
| EP | 1 653 190 A1 | 5/2006 |
| GB | 2 012 450 A | 7/1979 |
| JP | A-2003-149003 | 5/2003 |

\* cited by examiner

INTERFEROMETER FOR MEASURING DISPLACEMENT INFORMATION OF AN OBJECT

This application claims priority to Japanese Patent Application No. 2007-288524, filed Nov. 6, 2007, in the Japanese Patent Office. The Japanese Patent Application No. 2007-288524 is incorporated by reference in its entirety.

TECHNICAL FIELD

The present invention relates to an interferometer for measuring displacement information (a relative displacement) of an object to be measured based on an interference of a light.

RELATED ART

In related-art, there has generally been spread a method of obtaining a length measuring position and direction through a 2-phase sine wave having a phase difference of 90 degrees in a measuring device for measuring a length In order to obtain an accurate length measuring signal having a phase difference of 90 degrees, a countermeasure is taken against the measuring device of this type, for example, a structure and configuration of a detecting portion is properly designed and a structure for carrying out various phase adjustments (an optical phase adjusting portion) is provided in an inner part (for example, see Patent Document 1).

[Patent Document 1] Japanese Patent Unexamined Publication No. 2003-149003 Publication However, a related-art interferometer has a problem in that length measuring precision (small range precision) is deteriorated due to a phase error generated in an attaching adjustment or a phase error generated by an incomplete phase adjustment even if a proper design is carried out. Although the related-art interferometer has a structure in which a correcting signal processing circuit is provided in a subsequent stage, moreover, a correcting effect cannot be obtained in a measurement carried out in a high speed movement or a stationary state in some cases

SUMMARY

Exemplary embodiments of the present invention provide an interferometer capable of reducing a deterioration in measuring precision by eliminating an optical phase adjusting error to suppress a fluctuation in a DC component of an interference signal which is received.

An interferometer according to the invention includes a light source, a light wave dividing and synthesizing portion which divides a light irradiated from the light source into a first light to be irradiated on a first reflecting plane and a second light to be irradiated on a second reflecting plane, the light wave dividing and synthesizing portion synthesizing the first light reflected by the first reflecting plane and the second light reflected by the second reflecting plane to form a synthesized light, a multiphase interference light generating portion which generates, from the synthesized light, a first interference light having a first phase, a second interference light having a second phase which is different from the first phase by 180 degrees, a third interference light having a third phase which is different from the first phase by 90 degrees and a fourth interference light having a fourth phase which is different from the first phase by 270 degrees, a light receiving portion which receives the first to fourth interference lights, an interference signal generating portion which generates a first interference signal, a second interference signal, a third interference signal and a fourth interference signal based on the first to fourth interference lights thus received, a 3-phase signal generating portion which generates a 3-phase signal having a phase difference of 90 degrees based on a difference between the first to fourth interference signals, and a 2-phase signal generating portion which carries out a vector synthesis over the 3-phase signal having a phase difference of 90 degrees, thereby generating a 2-phasae signal having a phase difference of 90 degrees.

In the interferometer according to the invention, a differential signal between detecting signals which have a phase difference of 180 degrees from each other is obtained to acquire a signal having a phase difference of 90 degrees from the light receiving portion. Therefore, it is possible to eliminate an optical phase adjusting error, thereby suppressing a fluctuation in a DC component to reduce a deterioration in precision.

In the invention, it is preferable that the 3-phase signal generating portion should include a first differential signal generating portion which generates a first differential signal which is a difference between the first interference signal and the second interference signal, a second differential signal generating portion which generates a second differential signal which is a difference between the third interference signal and the fourth interference signal, and an inverted differential signal generating portion which generates an inverted differential signal obtained by inverting the second differential signal. Consequently, it is possible to generate an accurate 2-phase signal having a phase difference of 90 degrees.

In the invention, moreover, it is desirable that the interferometer should include a gain control portion which controls the gains of the first to fourth interference signals.

According to the invention, the vector synthesis processing is carried out for the detected signal. Consequently, it is possible to eliminate the phase error of the received interference signal, thereby suppressing a fluctuation in a DC component. Therefore, it is possible to provide an interferometer capable of reducing a deterioration in measuring precision.

Other features and advantages may be apparent from the following detailed description, the accompanying drawings and the claims.

DETAILED DESCRIPTION

An embodiment of an interferometer according to the invention will be described below with reference to the drawings.

Structure of Interferometer according to Embodiment

Figure 1:
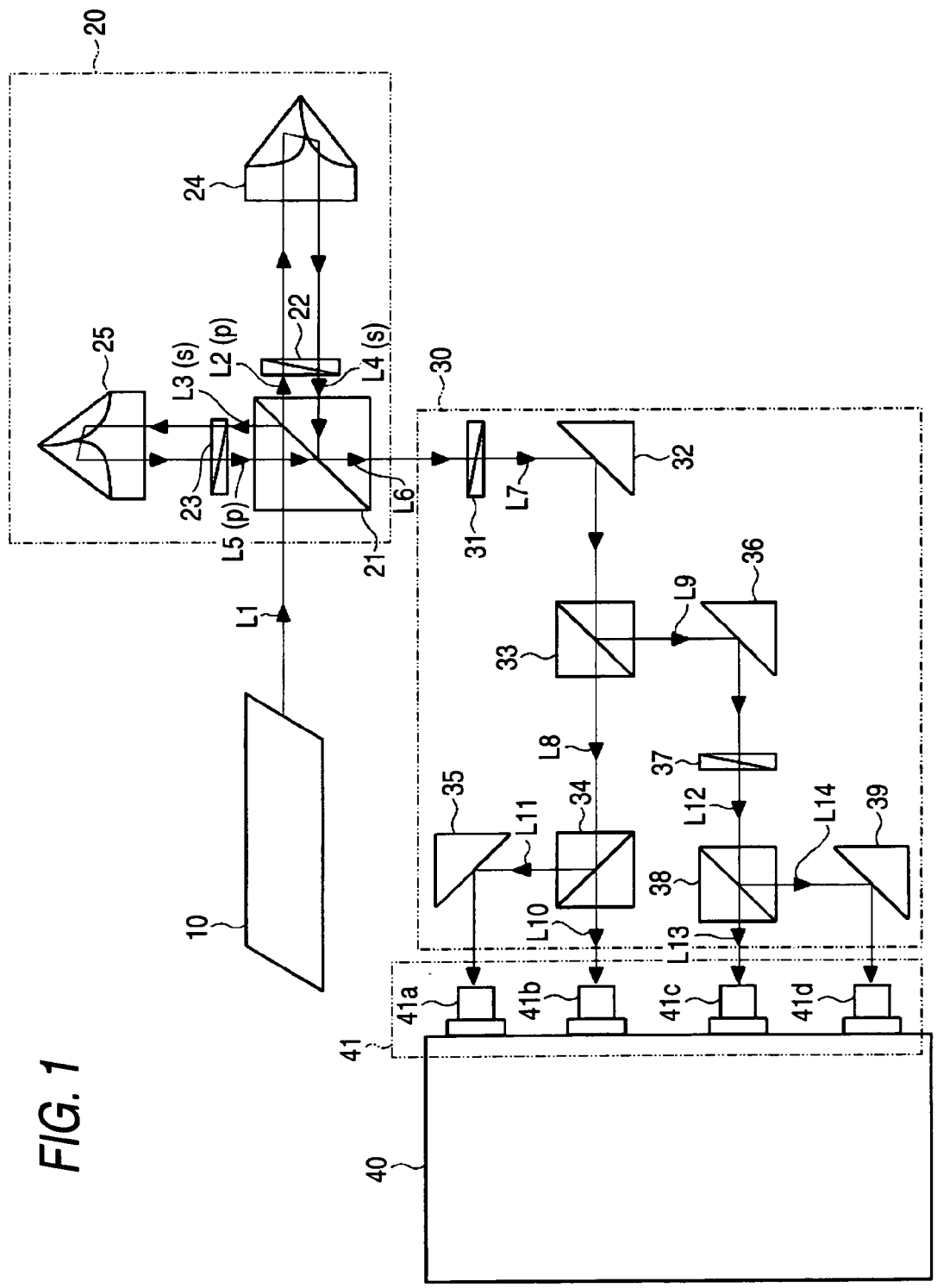
FIG. 1 is a schematic diagram showing a structure of an interferometer according to an embodiment of the invention.
Figure 2:
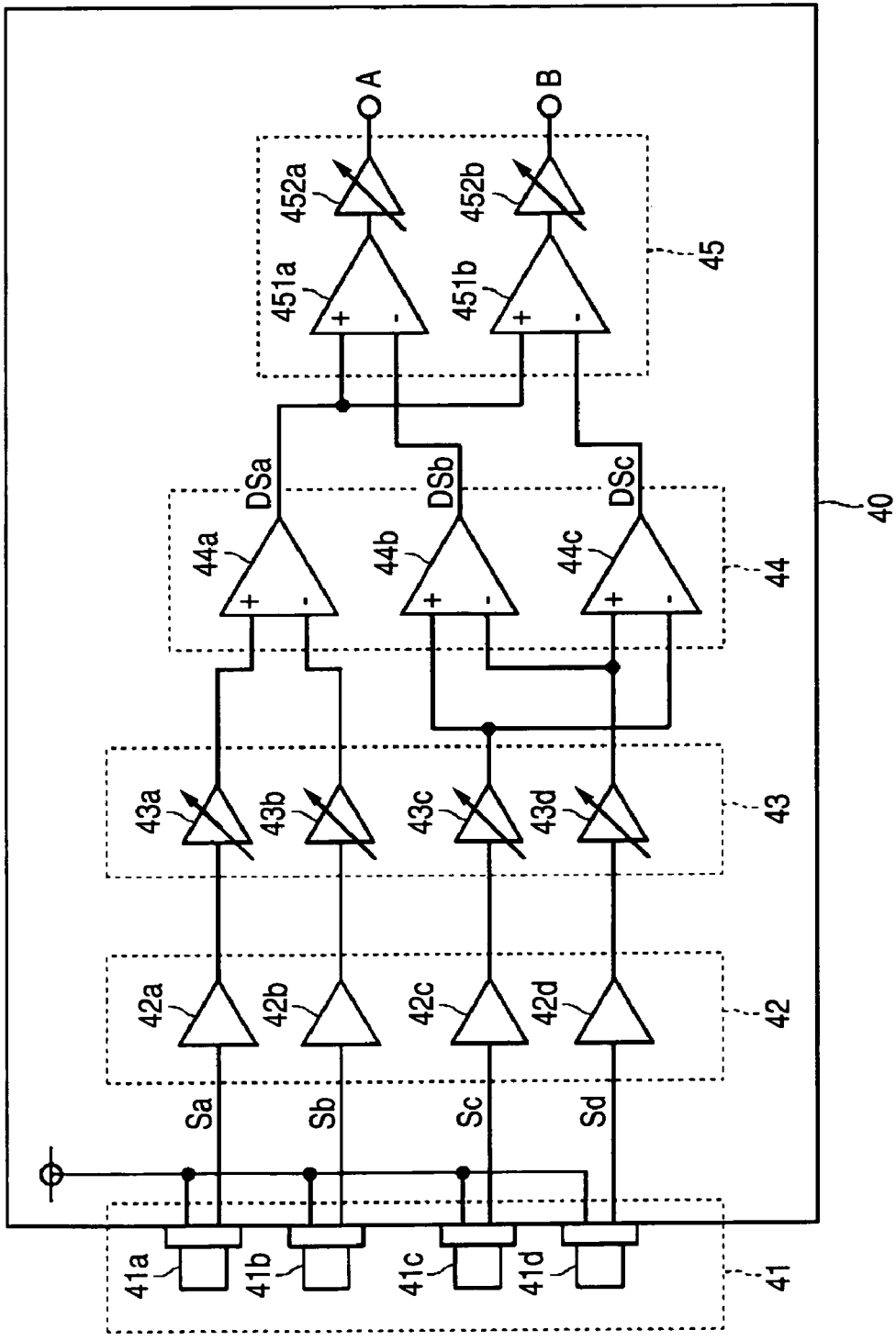
FIG. 2 is a schematic diagram showing structures of a light receiving portion and a signal processing circuit in the interferometer according to the embodiment of the invention.

First of all, a structure of the interferometer according to the embodiment of the invention will be described with reference to FIGS. 1 and 2. FIG. 1 is a schematic diagram showing the structure of the interferometer according to the embodiment of the invention and FIG. 2 is a schematic diagram showing structures of a light receiving portion and a signal processing circuit in the interferometer according to the embodiment of the invention.

As shown in FIG. 1, the interferometer according to the embodiment is constituted by a laser beam source 10, a light wave dividing and synthesizing portion 20, a multiphase interference light generating portion 30 and a signal processing portion 40.

The laser beam source 10 emits a laser beam having a uniform phase.

The light wave dividing and synthesizing portion 20 has a function for dividing and synthesizing a laser beam. The light wave dividing and synthesizing portion 20 has a first polarization beam splitter (PBS) 21, a first $\lambda/4$ wave plate 22, a second $\lambda/4$ wave plate 23, a measuring mirror 24, and a reference mirror 25.

In the light wave dividing and synthesizing portion 20, the first polarization beam splitter 21 is disposed in a position in which a laser beam irradiated from the laser beam source 10 is directly irradiated. The first $\lambda/4$ wave plate 22 is disposed in a position in which a p-wave laser beam transmitted through the polarization beam splitter 21 and emitted from the laser beam source 10 is irradiated. The second $\lambda/4$ wave plate 23 is disposed in a position in which an s-wave laser beam reflected by the polarization beam splitter 21 and emitted from the laser beam source 10 is irradiated. The measuring mirror 24 is disposed in a position in which a light transmitted through the first $\lambda/4$ wave plate 22 is irradiated. The reference mirror 25 is disposed in a position in which a light transmitted through the second $\lambda/4$ wave plate 23 is irradiated.

The multiphase interference light generating portion 30 has a function for generating four types of interference lights having different phase differences. The multiphase interference light generating potion 30 is constituted by a $\lambda/2$ wave plate 31, a first reflecting mirror 32, a non-polarization beam splitter (NPBS) 33, a second polarization beam splitter 34, a second reflecting mirror 35, a third reflecting mirror 36, a third $\lambda/4$ wave plate 37, a third polarization beam splitter 38 and a fourth reflecting mirror 39.

In the multiphase interference light generating portion 30, the $\lambda/2$ wave plate 31 is disposed in a position in which a light reflected by the measuring mirror 24 and transmitted through the first $\lambda/4$ wave plate 22 and a light reflected by the reference mirror 25 and transmitted through the second $\lambda/4$ wave plate 23 are synthesized and irradiated. The first reflecting mirror 32 is disposed in a position in which a light transmitted through the $\lambda/2$ plate 31 is irradiated. The non-polarization beam splitter (NPBS) 33 is disposed in a position in which a light reflected by the first reflecting mirror 32 is incident. The second polarization beam splitter 34 is disposed in a position in which a light transmitted through the non-polarization beam splitter (NPBS) 33 is irradiated. The second reflecting mirror 35 is disposed in a position in which a light reflected by the second polarization beam splitter 34 is irradiated. The third reflecting mirror 36 is disposed in a position in which a light reflected by the non-polarization beam splitter 33 is irradiated. The third $\lambda/4$ wave plate 37 is disposed in a position in which a light reflected by the third reflecting mirror 36 is irradiated. The third polarization beam splitter 38 is disposed in a position in which a light transmitted through the third $\lambda/4$ wave plate 37 is irradiated. The fourth reflecting mirror 39 is disposed in a position in which a light reflected by the third polarization beam splitter 38 is irradiated. The arrangement of the $\lambda/2$ wave plate 31 to the fourth reflecting mirror 39 which are the components of the multiphase interference light generating portion 30 is shown as an example in FIG. 1. For example, the multiphase interference light generating portion 30 may have a structure in which the first reflecting mirror 32 is omitted and the non-polarization beam splitter 33 is disposed in a position in which the light transmitted through the $\lambda/2$ wave plate 31 is irradiated.

The signal processing circuit 40 is constituted by a light receiving portion 41, a current/voltage converting portion 42, a gain control portion 43, a 3-phase signal generating portion 44 and a 2-phase signal generating portion The light receiving portion 41 has first to fourth light receiving units 41a to 41d. The light receiving units 41a to 41d are photodiodes or photoelectrical amplifiers, for example. The first light receiving unit 41a is provided in a position in which a first interference light (L11) reflected by the second polarization beam splitter 34 and reflected by the second reflecting mirror 35 is received. The second light receiving unit 41b is provided in a position in which a second interference light (L10) transmitted through the second polarization beam splitter 34 is received. The third light receiving unit 41c is provided in a position in which a third interference light (L13) transmitted through the third polarization beam splitter 38 is received. The fourth light receiving unit 41d is provided in a position in which a fourth interference light (L14) reflected by the third polarization beam splitter 38 and reflected by the fourth reflecting mirror 39 is received.

The first to fourth light receiving units 41a to 41d output first to fourth interference signals Sa to Sd based on the first to fourth interference lights. The first interference light has a predetermined phase and the second interference light has a phase difference of 180 degrees from the first interference light. Moreover, the third interference light has a phase difference of 90 degrees (270 degrees in a clockwise direction) from the first interference light, and the fourth interference light has a phase difference of 270 degrees (90 degrees in the clockwise direction) from the first interference light. Accordingly, the first to fourth interference signals Sa to Sd have the same phase differences as those of the first to fourth interference lights.

The current/voltage converting portion 42 is constituted by first to fourth current/voltage converting circuits 42a to 42d. The first to fourth light receiving units 41a to 41d are connected to the first to fourth current/voltage converting circuits 42a to 42d, respectively. The first to fourth current/voltage converting circuits 42a to 42d input the first to fourth interference signals Sa to Sd from the first to fourth light receiving units 41a to 41d.

The gain control portion 43 is constituted by first to fourth gain control circuits 43a to 43d. The first to fourth current/voltage converting circuits 42a to 42d are connected to the first to fourth gain control circuits 43a to 43d, respectively. The gain control portion 43 regulates, into predetermined values, signal efficiencies of the first to fourth interference signals Sa to Sd input through the first to fourth current/ voltage converting circuits 42a to 42d, and outputs them.

The 3-phase signal generating portion 44 is constituted by first to third differential amplifying circuits 44a to 44c. An output terminal of the first gain control circuit 43a is connected to a positive (+) side input terminal of the first differential amplifying circuit 44a. Moreover, an output terminal of the second gain control circuit 43b is connected to a negative (−) side input terminal of the first differential amplifying circuit 44a. An output terminal of the third gain control circuit 43c is connected to a positive (+) side input terminal of the second differential amplifying circuit 44b. Furthermore, an output terminal of the fourth gain control circuit 43d is connected to a negative (−) side input terminal of the second differential amplifying circuit 44b. The output terminal of the fourth gain control circuit 43d is connected to a positive (+) side input terminal of the third differential amplifying circuit 44c. In addition, the output terminal of the third gain control circuit 43c is connected to a negative (−) side input terminal of the third differential amplifying circuit 44c. In other words, the connection to the output terminals of the third gain control circuit 43c and the fourth gain control circuit 43d is inverted in the second differential amplifying circuit 44b and the third differential amplifying circuit 44c.

The 2-phase signal generating portion 45 has first and second differential amplifying circuits 451a and 451b and first and second gain control circuits 452a and 452b. An output terminal of the first differential amplifying circuit 44a is connected to a positive (+) input terminal of the first differential amplifying circuit 451a. Moreover, an output terminal of the second differential amplifying circuit 44b is connected to a negative (−) input terminal of the first differential amplifying circuit 451a. The output terminal of the first differential amplifying circuit 44a is connected to a positive (+) input terminal of the second differential amplifying circuit 451b. Moreover, an output terminal of the third differential amplifying circuit 44c is connected to a negative (−) input terminal of the second differential amplifying circuit 451b. Output terminals of the first and second differential amplifying circuits 451a and 451b are connected to input terminals of the first and second gain control circuits 452a and 452b.

Phase Difference Interference Signal Generating Operation in Interferometer according to Embodiment Next, a phase difference interference signal generating operation in the interferometer will be described with reference to FIG. 1. As shown in FIG. 1, the laser beam source 10 irradiates a laser beam L1. The laser beam L1 thus irradiated is divided into a p-wave laser beam L2 (p) and an s-wave laser beam L3 (s) through the polarization beam splitter 21.

The p-wave laser beam L2 (p) is shifted by a $\lambda/4$ phase through the first $\lambda/4$ wave plate 22 and is then reflected by the measuring mirror 24, and is shifted by a $\lambda/4$ phase through the first $\lambda/4$ wave plate 22 again. In other words, the p-wave laser beam L2 (p) is shifted by a $\lambda/2$ phase and is changed into an s-wave laser beam L4 (s) which is to be reflected by the polarization beam splitter 21.

On the other hand, the s-wave laser beam L3 (s) is shifted by a $\lambda/4$ phase through the second $\lambda/4$ wave plate 23 and is then reflected by the reference mirror 25, and is shifted by a $\lambda/4$ phase through the second $\lambda/4$ wave plate 23 again. In other words, the s-wave laser beam L3 (s) is shifted by a $\lambda/2$ phase and is changed into a p-wave laser beam L5 (p) which is to be reflected by the polarization beam splitter 21.

Accordingly, the s-wave laser beam L4 (s) and the p-wave laser beam L5 (p) are irradiated as a synthesized laser beam L6 from the polarization beam splitter 21 to the $\lambda/2$ wave plate 31.

Subsequently, the synthesized laser beam L6 is transmitted through the $\lambda/2$ wave plate 31 so that a polarization plane is rotated by 45 degrees. Accordingly, a synthesized laser beam L7 is obtained by synthesizing a 45-degree polarized light and a 135-degree polarized light.

Next, the synthesized laser beam L7 is reflected by the first reflecting mirror 32 and is then divided through the non-polarization beam splitter 33 into a synthesized laser beam L8 which is transmitted and a synthesized laser beam L9 which is reflected.

The synthesized laser beam L8 is divided into the transmitted interference light L10 and the reflected interference light L11 through the second polarization beam splitter 34. The interference light L10 is received by the second light receiving unit 41b. The interference light L11 is reflected by the second reflecting mirror 35 and is received by the first light receiving unit 41a.

In other words, the interference light L11 received by the first light receiving unit 41a is a first interference light having a phase with desirable displacement information. Moreover, the interference light L10 received by the second light receiving unit 41b is a second interference light having a different phase from the first interference light L11 by 180 degrees.

On the other hand, the synthesized laser beam L9 reflected by the non-polarization beam splitter 33 is reflected by the third reflecting mirror 36 and is then changed into a synthesized light L12 obtained by shifting one of lights constituting the synthesized laser beam L9 (a 45-degree polarized light and a 135-degree polarized light) by a $\lambda/4$ phase through the third $\lambda/4$ wave plate 37.

Next, the synthesized light L12 thus phase-shifted is divided into the interference light L13 which is transmitted through the third polarization beam splitter 38 and the interference light L14 which is reflected. The interference light L13 is received by the third light receiving unit 41c. The interference light L14 is reflected by the third reflecting mirror 39 and is received by the fourth light receiving unit 41d.

In other words, the interference light L13 received by the third light receiving unit 41c is a third interference light having a different phase from the first interference light L11 by 90 degrees. Moreover, the interference light L14 received by the fourth light receiving unit 41d is a fourth interference light having a different phase from the first interference light L11 by 270 degrees.

Figure 3:
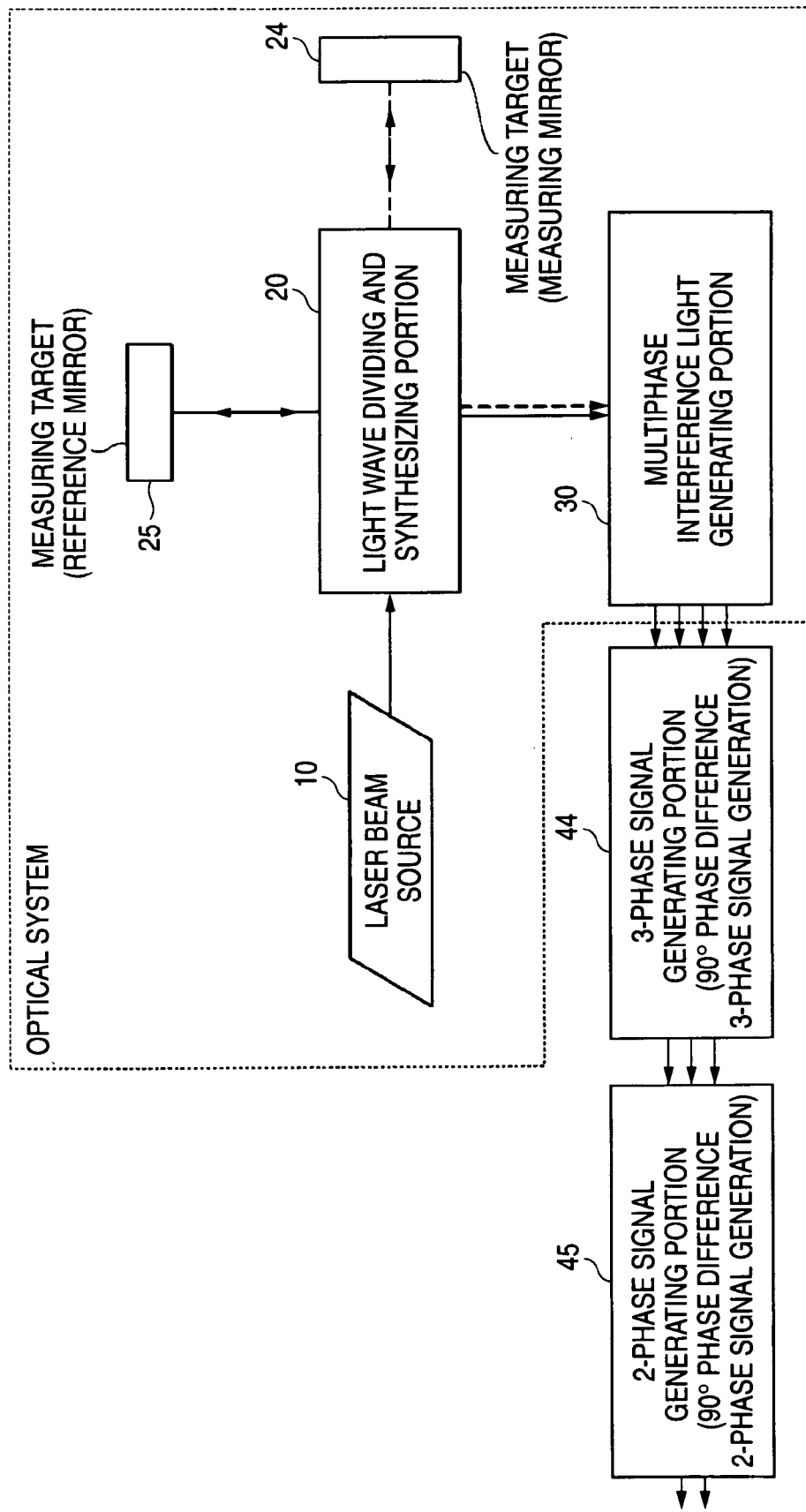
FIG. 3 is a diagram showing the summarized structures in FIGS. 1 and 2, FIGS. 4A to 4C are vector diagrams showing an example of a signal processing through the interferometer according to the embodiment of the invention.

The structure will be summarized. As shown in FIG. 3, the light wave dividing and synthesizing portion 20 carries out a 2-demultiplexing irradiation over a measuring target to synthesize a return light having each displacement information. In detail, the light wave dividing and synthesizing portion 20 divides the laser beam irradiated from the laser beam source 10 into a measuring light (a first light) to be irradiated on the measuring mirror (a first reflecting plane) 24 and a reference light (a second light) to be irradiated on the reference mirror (a second reflecting plane) 25. Moreover, the light wave dividing and synthesizing portion 20 synthesizes the measuring light reflected by the measuring mirror 24 and the reference light reflected by the reference mirror 25 to form a synthesized light.

Furthermore, the structure will be summarized. As shown in FIG. 3, the multiphase interference light generating portion 30 generates, from the synthesized light, a first interference light having a first phase, a second interference light having a second phase which is different from the first phase by 180 degrees, a third interference light having a third phase which is different from the first phase by 90 degrees, and a fourth interference light having a fourth phase which is different from the first phase by 270 degrees. A 3-phase signal having a phase difference of 90 degrees is generated in the 3-phase signal generating portion 44 on the basis of a difference between the first to fourth interference signals Sa to Sd based on the first to fourth interference lights, which will be described below in detail. Moreover, a 3-phase signal having a phase difference of 90 degrees is subjected to a vector synthesis so that a 2-layer signal having a phase difference of 90 degrees is generated in the 2-phase signal generating portion 45, which will be described below in detail.

Signal Processing Operation in Interferometer According to Embodiment

Figure 4A:
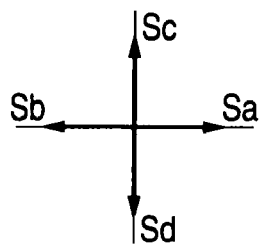
Figure 4B:
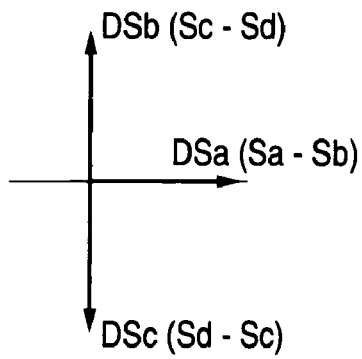
Figure 4C:
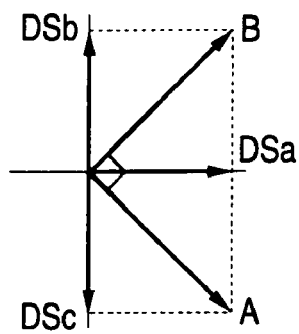

Next, a signal processing operation in the interferometer will be described with reference to FIGS. 2 to 9. FIG. 4A is a vector diagram showing a relationship of a phase and an intensity between the first to fourth interference signals Sa to Sd generated by the first to fourth light receiving units 41a to 41d. Moreover, FIG. 4B shows a relationship of a phase and an intensity in a signal generated in the 3-phase signal generating portion 44. FIG. 4C shows a relationship of a phase and an intensity in a signal generated in the 2-phase signal generating portion 45. Description and illustration will be given on the assumption that a phase shift is not generated in the first to fourth interference signals Sa to Sd.

As described above, the first to fourth light receiving units 41a to 41d generate the first to fourth interference signals Sa to Sd. The first and second interference signals Sa and Sb are input to the first differential amplifying circuit 44a of the 3-phase signal generating portion 44 through the first and second current/voltage converting circuits 42a and 42b and the first and second gain control circuits 43a and 43b in FIG. 2. The first and second interference signals Sa and Sb are regulated to have predetermined demultiplexing efficiencies by the first and second gain control circuits 43a and 43b and are thus output. The first differential amplifying circuit 44a differentially amplifies the first and second interference signals Sa and Sb and outputs a first differential signal DSa. The first differential signal DSa is obtained by taking a difference between the first interference signal Sa having a phase of zero degree and the second interference signal Sb having a phase of 180 degrees, and has a phase of zero degree which is identical to a reference phase if there is no phase shift between the interference signals Sa and Sb.

Similarly, the third and fourth interference signals Sc and Sd are input to the second differential amplifying circuit 44b of the 3-phase signal generating portion 44 through the third and fourth current/voltage converting circuits 42c and 42d and the third and fourth gain control circuits 43c and 43d. The third and fourth interference signals Sc and Sd are regulated to have predetermined demultiplexing efficiencies by the third and fourth gain control circuits 43c and 43d and are thus output. The second differential amplifying circuit 44b differentially amplifies the third and fourth interference signals Sc and Sd and outputs a second differential signal DSb. The second differential signal DSb takes a difference between the third interference signal Sc having a phase of 90 degrees and the fourth interference signal Sd having a phase of 270 degrees, and has a phase difference of 90 degrees from a reference phase if there is no phase shift between the third interference signal Sc and the fourth interference signal Sd.

Moreover, the third interference signal Sc and the fourth interference signal Sd are also input to the third differential amplifying circuit 44c of the 3-phase signal generating portion 44 through the third and fourth current/voltage converting circuits 42c and 42d and the third and fourth gain control circuits 43c and 43d. The third differential amplifying circuit 44c differentially amplifies the third interference signal Sc and the fourth interference signal Sd in the same manner as the second differential amplifying circuit 44b, and a third differential signal DSc to be an output signal thereof is obtained as an inverted differential signal having a phase which is different from the phase of the second differential signal DSb by 180 degrees. More specifically, the third differential signal DSc has a phase difference of 270 degrees (that is, −90 degrees) with respect to the reference phase. As shown in FIG. 4B, the first to third differential signals DSa, DSb and DSc having three phases obtained by the 3-phase signal generating portion 44 have a phase difference of 90 degrees, respectively.

Then, the first differential signal DSa and the second differential signal DSb are input to the first differential amplifying circuit 451a provided in the 2-phase signal generating portion 45. The first differential amplifying circuit 451a carries out a differential vector synthesis over two input signals, that is, the first differential signal DSa and the second differential signal DSb, thereby generating an A-phase signal. The first differential signal DSa having a phase of zero degree and the second differential signal DSb having a phase of 90 degrees are subjected to a vector synthesis. Therefore, the A-phase signal has a phase difference of −45 degrees from the reference phase.

Similarly, the first differential signal DSa and the third differential signal DSc are input to the second differential amplifying circuit 451b provided in the 2-phase signal generating portion 45. The second differential amplifying circuit 451b carries out a differential vector synthesis over two input signals, that is, the first differential signal DSa and the third differential signal DSc, thereby generating a B-phase signal. In the same manner as the A-phase signal, the first differential signal DSa having a phase of zero degree and the third differential signal DSc having a phase of 270 degrees (−90 degrees) are subjected to the differential vector synthesis. Therefore, the B-phase signal has a phase of 45 degrees with respect to the reference phase. Thus, the A-phase and B-phase signals thus obtained have a phase difference of 90 degrees and have equal intensities to each other (see FIG. 4C).

With reference to FIG. 5, next, description will be given to the case in which an initial phase error 6 from the first and second interference signals Sa and Sb is generated on the third and fourth interference signals Sc and Sd. For example, in the interferometer, a strict phase plate regulation cannot be carried out and the initial phase error δ is generated on the interference signal. FIG. 5A is a vector diagram showing the case in which the third and fourth interference signals Sc and Sd ideally have a phase difference of 90 degrees from the first and second interference signals Sa and Sb and further have a shift of the initial phase error δ from 90 degrees. FIG. 5B shows a relationship of the phases and intensities between the first to third differential signals DSa to DSc having three phases which are generated in the 3-phase signal generating portion 44. FIG. 5C shows a relationship of the phases and intensities between the A-phase signal and the B-phase signal which are generated in the 2-phase signal generating portion 45.

The first to fourth interference signals Sa to Sd are input to the first to third differential amplifying circuits 44a to 44c of the 3-phase signal generating portion 44 as described above, and the first to third differential signals DSa to DSc are output. Since the second differential signal DSb has the phase shift δ from the first differential signal DSa, it has no phase difference of 90 degrees but a phase difference of (90−δ) degrees from the first differential signal DSa. Since the third differential signal DSc generated by the third differential amplifying circuit 44c is obtained by inverting the second differential signal DSb, it has a phase difference of 180 degrees from the second differential signal DSb and has the phase shift δ from the first differential signal DSa in the same manner as the second differential signal DSb. Therefore, the third differential signal Dsc has a phase difference of (270−δ) degrees from the first differential signal DSa.

Figure 5A:
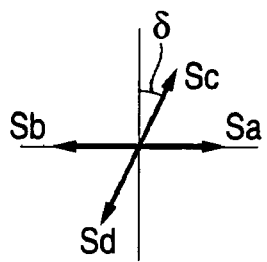
FIGS. 5A to 5D are vector diagrams showing another example of the signal processing through the interferometer according to the embodiment of the invention.
Figure 5B:
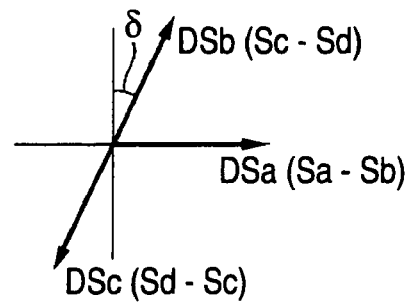

As shown in FIG. 5B, the third and fourth interference signals Sc and Sd in the first to third differential signals DSa to DSc having three phases obtained by the 3-phase signal generating portion 44 have the initial phase error δ. Therefore, they do not have a phase difference of 90 degrees from each other but includes the initial phase error δ.

Figure 5C:
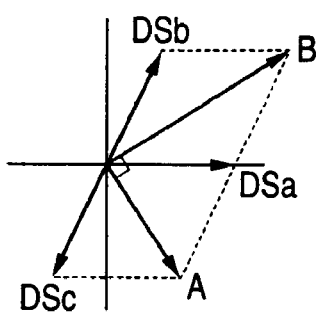

Then, the first differential signal DSa and the second differential signal DSb in the first to third differential signals DSa to DSc having three phases with the initial phase error δ are input to the first differential amplifying circuit 451a of the 2-phase signal generating portion 45 and are subjected to a vector synthesis. As shown in FIG. 5C, consequently, the A-phase signal is obtained. A processing in the 2-phase signal generating portion 45 is a differential vector synthesis. Therefore, the A-phase signal has a phase of (−45−δ/2) degrees.

Moreover, the first differential signal DSa and the third differential signal DSc are also input to the second differential amplifying circuit 451b of the 2-phase signal generating portion 45 and are subjected to the differential vector synthesis so that the B-phase signal is obtained. The B-phase signal has a phase of (45−δ/2) degrees.

Thus, 2-phase signals A and B thus obtained have a phase difference of 90 degrees even if the phase shift is generated on the original first to fourth interference signals Sa to Sd. More specifically, also in the case in which the first to fourth interference signals Sa to Sd have the phase shift, it is possible to obtain the A-phase signal and the B-phase signal having a phase difference of 90 degrees without carrying out a phase control operation (see FIG. 5C).

Figure 5D:
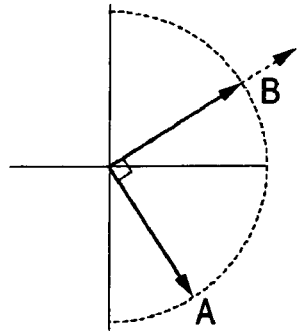

The processing for generating the 2-phase signals A and B having a phase difference of 90 degrees in the 2-phase signal generating portion 45 is the vector synthesis. Therefore, the 2-phase signals A and B have different signal intensities from each other as shown in FIG. 5C. In this case, in the 2-phase signal generating portion 45, the 2-phase signals A and B are generated and the gains of the respective signals A and B are then controlled by the gain control circuits 452a and 452b provided in the 2-phase signal generating portion 45. Consequently, it is possible to generate the A-phase and B-phase signals having a phase difference of 90 degrees and an equal intensity as shown in FIG. 5D.

Figure 6A:
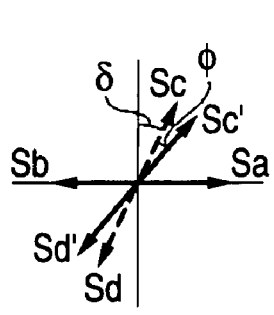
FIGS. 6A to 6D are vector diagrams showing a further example of the signal processing through the interferometer according to the embodiment of the invention.
Figure 6B:
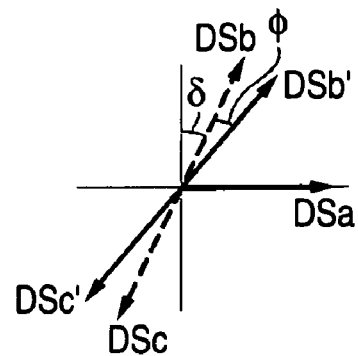
Figure 6C:
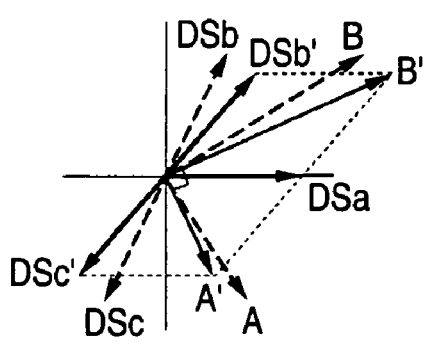
Figure 6D:
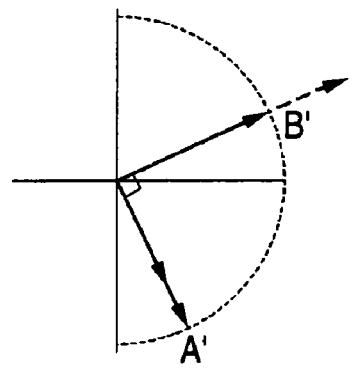
Figure 7:
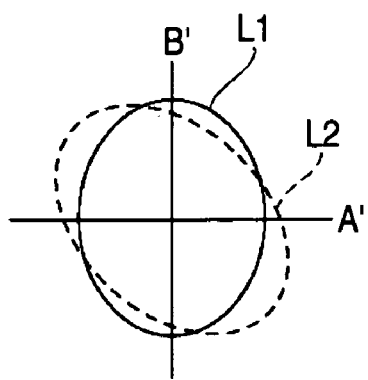
FIG. 7 is a diagram showing a Lissajou's waveform according to the further example of the signal processing through the interferometer according to the embodiment of the invention.

With reference to FIGS. 6A to 7, next, description will be given to the case in which a phase error fluctuation φ is generated from the initial phase error δ in the third and fourth interference signals Sc and Sd. The phase error fluctuation φ is generated in the case in which a fixation of the λ/4 wave plate fluctuates thermally and mechanically and the case in which the wave plate has a temperature characteristic so that the phase difference is shifted in the interferometer, for example. FIG. 6A shows a relationship of a phase and an intensity between signal vectors Sc' and Sd' fluctuating with the phase error fluctuation φ with respect to the initial phase error δ of the third and fourth interference signals Sc and Sd. FIG. 6B shows a relationship of a phase and an intensity between first to third differential signals Dsa, Dsb' and Dsc' generated based on the first to fourth interference signals Sa, Sb, Sc' and Sd'. FIG. 6C shows a relationship of a phase and an intensity between A'-phase and B'-phase signals generated based on the first to third differential signals Dsa, Dsb' and Dsc'.

Since the second differential signal DSb' has a phase shift of (δ+φ) with respect to a first differential signal DSa', it does not have a phase difference of 90 degrees but a phase difference of (90−δ−φ) degrees from the first differential signal DSa. Since the third differential signal DSc' is obtained by inverting the second differential signal DSb', it has a phase difference of 180 degrees from the second differential signal DSb' and has a phase shift of (δ+φ) with respect to the first differential signal DSa in the same manner as the second differential signal DSb'. Therefore, it has a phase difference of (270−δ−φ) degrees from the first differential signal DSa.

As shown in FIG. 6B, the first to third differential singles DSa, DSb' and DSc' having three phases do not have a phase difference of 90 degrees from each other but include the initial phase error δ and the phase differential fluctuation φ because the third and fourth interference signals Sc' and Sd' have the initial phase error δ and the phase differential fluctuation φ.

As shown in FIG. 6C, when the first differential signal Dsa and the second differential signal Dsb' are subjected to a differential vector synthesis, the A'-phase signal is set to have a phase of ('45−δ/2−φ/2) degrees.

As shown in FIG. 6C, when the first differential signal Dsa and the third differential signal Dsc' are subjected to the differential vector synthesis, the B'-phase signal is set to have a phase of (45−δ/2−φ/2) degrees.

By controlling the gains of the A'-phase signal and the B'-phase signal through the gain control circuits 452a and 452b provided in the 2-phase signal generating portion 45, it is possible to generate the A'-phase signal and the B'-phase signal which have a phase difference of 90 degrees and an equal intensity as shown in FIG. 6D.

FIG. 7 shows a Lissajous signal L1 based on the A'-phase signal and the B'-phase signal which have a phase difference of 90 degrees and generated in the case in which the phase error fluctuation φ is produced from the initial phase error δ and a Lissajous signal L2 generated by a related-art method. In the case in which the dynamic phase error fluctuation φ is produced on the wave plate, a 2-phase vector signal has a phase error as shown in the Lissajous signal L2 through the related-art method. On the other hand, according to the interferometer in accordance with the embodiment, the A'-phase signal and the B'-phase signal do not make a phase error but only a gain fluctuation as shown in the Lissajous signal L1. Accordingly, it is possible to reduce an influence on small range precision.

Figure 8A:
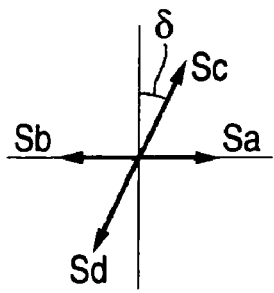
FIGS. 8A to 8D are vector diagrams showing a further example of the signal processing through the interferometer according to the embodiment of the invention.
Figure 8B:
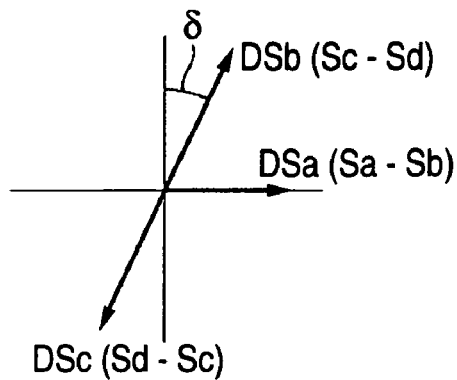
Figure 8C:
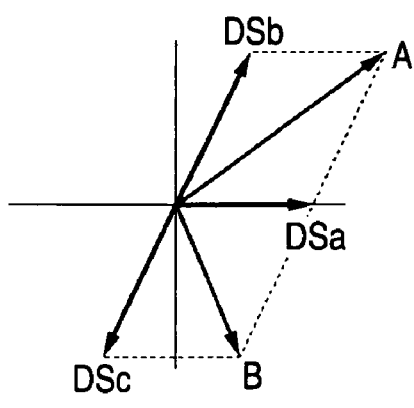
Figure 8D:
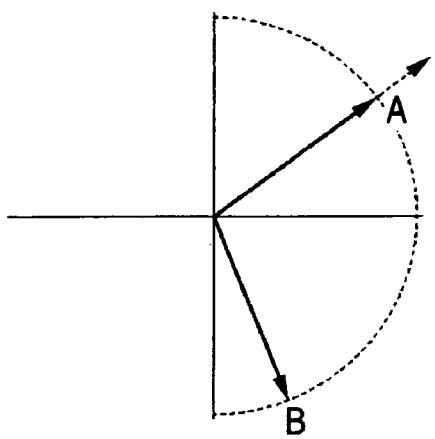
Figure 9:
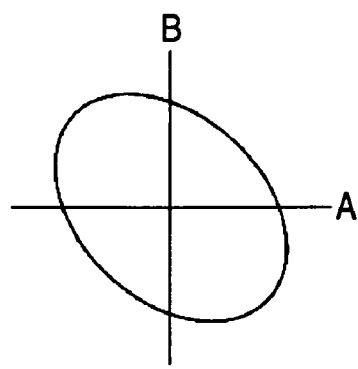
FIG. 9 is a diagram showing a Lissajou's waveform according to the further example of the signal processing through the interferometer according to the embodiment of the invention.

With reference to FIGS. 8A to 9, next, description will be given to the case in which the signal intensities of the third and fourth interference signals Sc and Sd and those of the first and second interference signals Sa and Sb dynamically have a difference. The difference between the signal intensities is made in the case in which a fluctuation in a branching ratio of a beam splitter or a fluctuation in a transmittance of a mirror and λ/4 wave plate is caused in the multiphase interference light generating portion 30 of the interferometer, for example. FIG. 8A shows a phase and an intensity of each of the first to fourth interference signals Sa to Sd generated in the first to fourth light receiving units 41a to 41d in the case in which the signal intensities are different from each other. FIG. 8B shows a phase and an intensity of each of the first to third differential signals DSa to DSc generated from the first to fourth interference signals Sa to Sd. FIG. 8C shows a relationship of a phase and an intensity in the signal generated in the 2-phase signal generating portion 45. Description and illustration will be given on the assumption that the third and fourth interference signals Sc and Sd have a shift of the initial phase error δ with respect to the first and second interference signals Sa and Sb.

In the embodiment, the first and second interference signals Sa and Sb are deteriorated in the first and second light receiving units 41*a* and 41*b* for the reason described above (see FIG. 8A). The first differential signal DSa generated in the 3-phase signal generating portion 44 from the first and second interference signals Sa and Sb is also deteriorated. On the other hand, the third and fourth interference signals Sc and Sd output from the third and fourth light receiving units 41*c* and 41*d* are not deteriorated. The second differential signal DSb and the third differential signal DSc which are generated in the 3-phase signal generating portion 44 from the third and fourth interference signals Sc and Sd are not deteriorated (see FIG. 8B).

Since the first differential signal DSa is deteriorated in the first to third differential signals DSa to DSc which have three phases and are output from the 3-phase signal generating portion 44, a signal intensity thereof is varied (see FIG. 8B). When the first to third differential signals DSa to DSc having three phases are input to the 2-phase signal generating portion 45 to carry out a vector synthesis, the A-phase signal and the B-phase signal which do not have a phase difference of 90 degrees are output as shown in FIG. 8C. Then, the gains of the A-phase signal and the B-phase signal are controlled in the gain control circuits 452*a* and 452*b* and have an equal intensity (see FIG. 8D).

FIG. 9 shows a Lissajous signal based on the two signals A and B having a phase difference of 90 degrees which are generated in the case in which the signal intensities of the third and fourth interference signals Sc and Sd and those of the first and second interference signals Sa and Sb dynamically have a difference according to the embodiment. A Lissajou's figure shown in FIG. 9 takes an elliptical shape and has a center which is not shifted because the A-phase and B-phase signals which are generated have no phase difference of 90 degrees.

In the case in which a fluctuation is generated in a two-divided intensity of a synthesized light in the multiphase interference light generating portion 30, the 2-phase signal generated by the interferometer according to the embodiment does not accurately have a phase difference of 90 degrees. However, a set of light receiving portions for carrying out a related-art differential processing is disposed diagonally around the light source. As compared with a DC fluctuation which is generated, therefore, a deterioration (an error) in small range precision of a detection through the 2-phase signal which has a phase difference and is obtained from the interferometer according to the embodiment is equal to or smaller than a half. For this reason, the interferometer according to the embodiment is also effective in the case in which a defect is generated in a part of the multiphase interference light generating portion 30.

Thus, the interferometer according to the embodiment uses the vector synthesis in the signal processing, thereby conditioning a signal. The 3-phase signal having a phase shift accurately has a phase difference of 90 degrees in a processing process. In the 3-phase signal having a phase shift, consequently, it is possible to obtain a desirable 2-phase signal having a phase difference of 90 degrees without carrying out a phase adjusting operation using a variable resistor. Moreover, the interferometer according to the embodiment is also effective in the case in which a cycle signal is deteriorated.

As described above, the A-phase and B-phase signals having the phase difference of 90 degrees which are obtained in the interferometer according to the embodiment have signal intensities which are approximately √2 times as high because the first to third differential signals DSa to DSc having three phase are subjected to the vector synthesis in the 2-phase signal generating portion 45. Consequently, a signal to noise ratio is improved by 3 dB.

In the 2-phase signal generating portion 45, moreover, it is possible to obtain a 2-phase signal in a phase difference of 90 degrees which has an equal intensity after the vector synthesis by controlling the gain of the signal.

Although the embodiment according to the invention has been described above, the invention is not restricted thereto but various changes and additions can be made without departing from the scope of the invention.

What is claimed is:

1. An interferometer comprising:
   a light source;
   a light wave dividing and synthesizing portion which divides a light irradiated from the light source into a first light to be irradiated on a first reflecting plane and a second light to be irradiated on a second reflecting plane, the light wave dividing and synthesizing portion synthesizing the first light reflected by the first reflecting plane and the second light reflected by the second reflecting plane to form a synthesized light;
   a multiphase interference light generating portion which generates, from the synthesized light, a first interference light having a first phase, a second interference light having a second phase which is different from the first phase by 180 degrees, a third interference light having a third phase which is different from the first phase by 90 degrees and a fourth interference light having a fourth phase which is different from the first phase by 270 degrees;
   a light receiving portion which receives the first to fourth interference lights;
   an interference signal generating portion which generates a first interference signal, a second interference signal, a third interference signal and a fourth interference signal based on the first to fourth interference lights thus received;
   a 3-phase signal generating portion which generates a 3-phase signal having a phase difference of 90 degrees based on a difference between the first to fourth interference signals; and
   a 2-phase signal generating portion which carries out a vector synthesis over the 3-phase signal having a phase difference of 90 degrees, thereby generating a 2-phase signal having a phase difference of 90 degrees.

2. The interferometer according to claim 1, wherein the 3-phase signal generating portion includes:
   a first differential signal generating portion which generates a first differential signal which is a difference between the first interference signal and the second interference signal;
   a second differential signal generating portion which generates a second differential signal which is a difference between the third interference signal and the fourth interference signal; and
   an inverted differential signal generating portion which generates an inverted differential signal obtained by inverting the second differential signal.

3. The interferometer according to claim 1, further comprising:

a gain control portion which controls gains of the first to fourth interference signals.

4. The interferometer according to claim 2, further comprising:

a gain control portion which controls gains of the first to fourth interference signals.

* * * * *